March 31, 1970   H. GMEINER   3,503,324
COLLAPSIBLE CHARCOAL GRILL

Filed Nov. 8, 1967   2 Sheets-Sheet 1

Inventor:
Hans Gmeiner
BY Spencer & Kaye
Attorneys

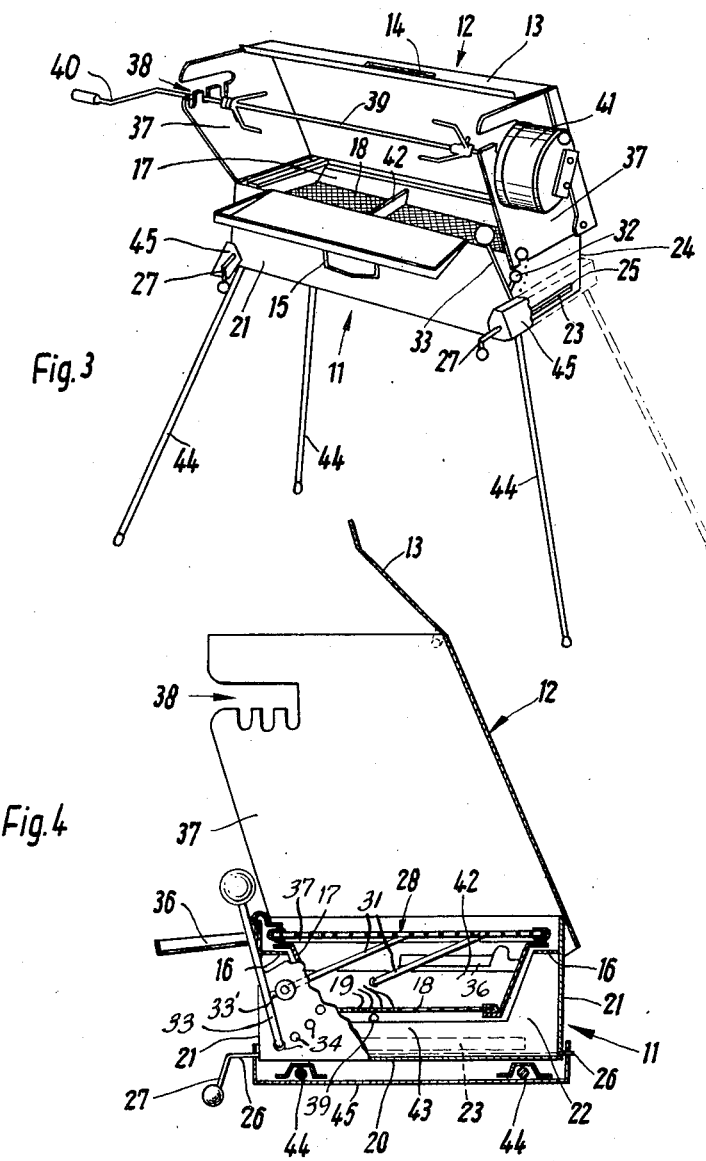

United States Patent Office 3,503,324
Patented Mar. 31, 1970

3,503,324
COLLAPSIBLE CHARCOAL GRILL
Hans Gmeiner, Ganghoferstrasse 52,
Munich, Germany
Filed Nov. 8, 1967, Ser. No. 681,401
Claims priority, application Germany, Nov. 10, 1966,
G 35,828
Int. Cl. A47j 37/08
U.S. Cl. 99—393                          11 Claims

ABSTRACT OF THE DISCLOSURE

A collapsible charcoal grill including a housing having an open top which is closable by a cover member and containing a charcoal pan and grill bars disposed above the pan and adjustable in height with respect to the pan, the pan being disposed in the housing in such a manner as to define at least one air space with the floor and side walls of the housing, the pan and housing being arranged to close the air space around the upper edges of the housing side walls, at least one lateral side wall having an adjustable opening for the passage of air to the air space, the grill further including lever means for adjusting the height of the grill bars over a large range, detachable members for providing a heat deflector, for protecting the grilling area from wind, and for supporting a rotary spit, and collapsible or foldable legs for supporting the grill when it is to be used.

BACKGROUND OF THE INVENTION

The present invention relates to a charcoal grill, and particularly to a portable grill which is constructed in an optimum manner, which can be easily collapsed to occupy a minimum space so that it can be easily transported and stored in a suitcase-type container, and which can be set up for general use with equal ease.

Grills of this type in a wide variety of forms are known per se. These grills, as typified by the grills presently on the market, have considerable shortcomings which adversely affect the convenience with which they can be used. In particular, it has been found that the known grills do not have means, or have inedquate means, for regulating the fire under the grill. Furthermore, in only a few of these grills can the height of the grill bars be adjusted in relation to the fire.

SUMMARY OF THE INVENTION

It is the primary object of the present invention to overcome these drawbacks and difficulties.

Another object of the present invention is to substantially increase the capabilities of portable outdoor grills.

Yet another object of the present invention is to achieve a more accurate control of the grilling operation by permitting the amount of air supplied to the burning fuel to be accurately adjusted and by protecting the food being grilled from the wind.

Still another object of the present invention is to permit a charcoal grill to be readily folded into suitcase form for easy transportation and storage.

A still further object of the present invention is to provide such a grill with easily foldable supporting legs.

These and other objects according to the present invention are achieved by certain improvements in a collapsible charcoal-grilling device composed of a box-shaped housing having an open top, a cover for closing the housing top, a pan disposed in the housing for holding the charcoal fuel, grill bars mounted above the pan and adjustable in height relative to the pan, and supporting legs mounted on the housing. According to the improvements of the present invention, the pan is readily removable and is disposed in the housing to define an air space between the pan and the bottom and side walls of the housing, which air space is closed off by the pan and side walls at the upper edges of the walls, at least the bottom of the pan being provided with air passages for permitting air to flow from the air space to the region in which charcoal is to be burned. In further accordance with the improvements of the present invention, at least one lateral wall of the housing is provided with an opening communicating with at least part of the air space for the passage of air thereto, and the device further includes at least one movable blocking member associated with the opening for controlling the effective size thereof and hence the air flow therethrough, the blocking member being capable of completely closing the opening.

In the charcoal grill according to the present invention the disadvantages of the known devices are eliminated. The invention is particularly distinguished by the presence of a number of features which are very significant and useful and which make possible and advantageous the universal application of the device according to the present invention for all kinds of purposes. Although individual features thereof are known per se, the combination of the features, which are to be described in detail below, gives the grill its universal utility.

In a further embodiment a pivotal flap is attached to the free edge of the housing cover and serves to vary the effective distance between the food rotating on the spit and the edge of the cover. It has been found that a proper adjustment of this distance has a particularly advantageous effect on the quality of the grilled product. For transporting the grill, this flap is folded over the longitudinal front wall, and a handle provided on this front wall is made foldable so that it can be pushed through a longitudinal slit in the flap and folded over, thus causing the cover to be locked.

The legs to support the device can further be advantageously disposed on hinges and these hinges can be pivoted around the lower lateral wall edge. When the grill is folded up for transport, the ends of the legs on one side which are fastened to the inner side of the hinge come to rest between the point of attachment and the folded-over side edge of the opposite leg or hinge, respectively. When the hinge is folded over, the legs belonging to this hinge can be inserted into a recess in the opposite hinge and can then be spread out so that an unintentional opening is eliminated.

As has been mentioned above, the grill bars are adjustable in height relative to the charcoal pan. The height adjustment of these grill bars is preferably effectuated by means of two parallelogram linkages each disposed adjacent a respective lateral side of the grill and composed essentially of two pivotal rods each having one end pivotally connected to a side wall of the housing and its other end pivotally connected to a respective one of two support rails which support the grill bars through the intermediary of a rectangular grill frame resting directly on these support rails. A height-adjusting arrangement of this type has the advantage of causing the grill bars to remain horizontal regardless of the height to which they are adjusted.

In addition, the action of the parallelogram linkages is such that the grill bar assembly will follow a generally oblique straight line path when moved from one height to another, the height selected being that required for an optimum spacing between the charcoal pan and the particular food to be grilled.

According to a particularly advantageous feature of the present invention, when the grill is in use, the housing cover is preferably held in an inclined position, by means of detachable side sheets, for example, so that the cover extends parallel to the path followed by the grill bars during their height adjustment. This assures that the grill bars will always be the same distance from the cover and permits the cover to effectively direct the hot gasses rising from the fire to be directed against or below the food being grilled even when the grill bars are in a relatively elevated position. This results in an extremely efficient heat utilization and hence a reduced fuel consumption. The pivotal gas- and heat-deflecting flap mentioned earlier contributes to this result and is particularly effective when the grill is employed in conjunction with a rotary spit.

BRIEF DESCRIPTION OF THE DRAWINGS

FIGURE 3 is a view similar to that of FIGURE 2 showing the device provided with a rotary spit.

FIGURE 4 is an elevational view partly in cross section, of the embodiment of FIGURE 3.

DESCRIPTION OF THE PREFERRED EMBODIMENTS

Figure 1:
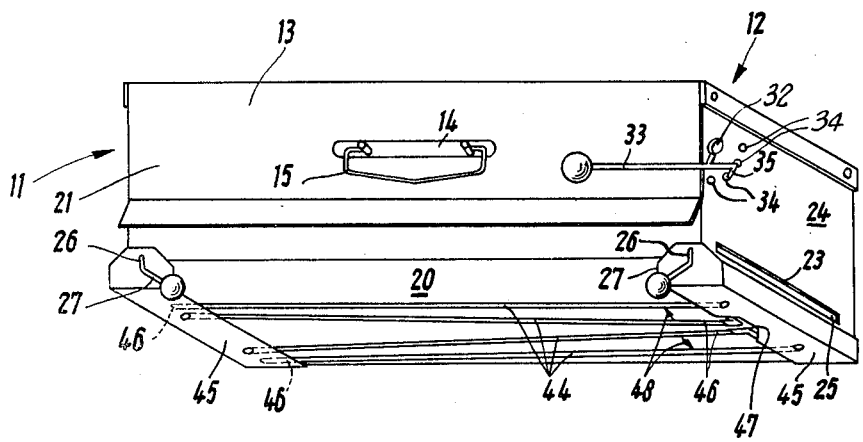
FIGURE 1 is a perspective view from the bottom, of a preferred embodiment of the present invention in its collapsed state.

As can be seen in FIGURE 1, the grill according to the present invention has a housing 11 in the general form of a suitcase in which all of the component parts can be stored. The housing 11 can be closed by a fold-away cover 12. The cover 12 is secured in its closed position by a flap 13 pivotally connected to the leading edge of cover 12 and provided with a slit 14 through which a carrying handle 15 fastened to the housing 11 can be pushed. The handle is preferably mounted so as to be pivotal in such a manner that it can be folded over to secure flap 13 against the front side wall of housing 11.

Figure 2:
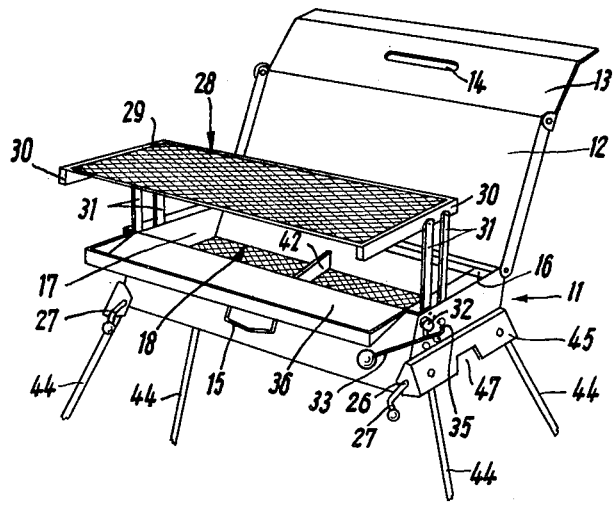
FIGURE 2 is a perspective view showing the device of FIGURE 1 set up for use with the grill bars at their maximum height.

Somewhat below the plane of the upper edge of housing 11 there are, as best seen in FIGURES 2 and 4, rails 16 on which the pan 17 for the charcoal rests. The bottom 18 of the pan 17 is provided with openings 19 for the passage of air and is preferably made of wire mesh or of a finely perforated metal sheet, or sieve, or the like.

The plan 17 is either so constructed or so disposed in the housing 11 that, as shown in FIGURE 4, a sufficiently large air space 22 is available between the pan and the bottom 20 and front and rear side walls 21 of housing 11 for the passage of air for combustion to the openings 19 in the bottom 18 of the charcoal pan 17. The air for combustion is admitted to this air space through slits 23 provided in the narrow lateral side walls 24 of the housing 11. The size of the openings presented by the slits 23 can be adjusted, or the openings can be completely closed, as indicated in FIGURES 1 and 3, by pivotal air flaps 25 each disposed adjacent the inner surface of a respective one of the lateral walls 24. The pivot shafts 26 on which the flaps are mounted are brought to the outside through the front side wall 21 of the housing 11 and are provided with pivoting levers 27 by means of which the air flaps 25 can be adjusted to close the slits 23 to a greater or lesser extent in order to control the amount of air for combustion reaching the glowing charcoal in the pan 17.

Referring now specifically to FIGURES 2 and 4, the grill bars, or grating, 28 are mounted in a frame 29 which rests on two supporting rails 30. A pair of parallel lever arms 31 is pivotally attached between each rail 30 and a respective lateral side wall 24 of the housing 11. One of the levers 31 on one side of the grill has a stud 32 rigidly attached thereto at its pivot. This stud extends to the outside through the adjacent side wall 24. A height-adjustment operating lever 33 is pivotally or foldably fastened to the stud 32, as shown in FIGURE 1. Lever 33 is attached to stud 32 by means of a pivot arm 33' which is mounted to rotate stud 32. Arm 33' can either be permanently connected to stud 32 or it can be force-fitted into a bore in stud 32 so as to be readily removable therefrom for permitting lever 33 to be placed inside the grill when the grill is to be collapsed for storage. In either event, either arm 33' is pivotal about its own axis or lever 33 is pivotal about the axis of arm 33' to permit the lever to be folded against the front side wall 21 when not in use, this folded position being shown in FIGURE 1. For raising or lowering the grill bars, lever 33 is placed in the position shown in FIGURES 2, 3 and 4 and, by pivoting the lever 33 up or down, and thus rotating the stud 32, the lever arm 31 attached to this stud is pivoted up or down so that the support rails 30 holding the grill bars 28 will be raised or lowered while remaining horizontal. The stud 32 may be integral with a shaft connected to the pivot point of the corresponding lever arm on the other side of the grill. To hold the grill 28 at the desired height, either a clamping device is provided on the lever arms 31 to hold the grill in the desired position, or detent holes 34 are provided in the housing wall 24 into any selected one of which the right-angle bent end 35 of the operating lever 33 engages.

To hold the grill bars 28 in position on rails 30, frame 29 can be provided at each lateral side with bores which engage associated pegs provided on rails 30.

In order to prevent liquids, such as juices, grease, or the like, dripping from the grill 28 when it is in an elevated position or from the rotating spit when it is used, from falling onto the ground around the grill, a drip pan 36 can be attached to the upper edge of the frontal lateral wall 21 of the housing 11, the preferred manner of attachment being shown in FIGURE 4.

In order to support the housing cover 12 and to protect the food and the fire from the wind when the grill is used outdoors, upright side sheets 37 can be attached, as shown in FIGURE 3, to the lateral side walls 24 of the housing 11, thus extending the walls upwardly, and the cover 12 can be folded thereagainst to assume the desired inclined position. For mounting purposes, the side sheets 37 can be provided along the bottoms with notches arranged to seat around mating pegs extending from lateral side walls 24. These pegs can be threaded to receive knurled fastening nuts. The sheets 37 can be further held in position by the folded lateral edges of cover 12. Recesses 38 are provided in the side sheets 37 to hold the rotating spit in different positions. The spit 39 can be rotated either manually with the aid of a hand crank 40 or automatically by means of a motor 41.

It is of particular advantage to provide a vertical separator sheet 42 (FIGURES 2 to 4) within the charcoal pan 17 to divide the pan into two compartments so that only one half of the grill need be used when the entire grill surface is not needed, or so that different fire conditions can be created in each half of the pan. A corresponding separator sheet 43 (FIGURE 4) is disposed in the air space 22 between the pan 17 and the housing 11 and is attached to the front and rear side walls 21 of the housing 11 and to its bottom 20 for dividing the air space into two compartments corresponding to the two compartments of pan 17. This separator sheet 43 permits fires of different intensity to be maintained in the two compartments of charcoal pan 17, the separately controllable flaps 25 at each side of the grill controlling the influx of air to each compartment.

It has furthermore been found to be particularly advantageous for grilling chickens or other food on the rotating spit, to dispose the axis of the rotating spit in such a manner that it lies in a vertical plane either directly in line with, or, preferably, in front of, the front edge of the charcoal pan 17 so as to prevent the grease given off during cooking from dripping into the fire and thus producing annoying smoke.

Furthermore, the flap 13, which also serves to close the cover and which is pivotally attached to the free cover edge, has the additional advantage that it can be positioned to decrease the effective distance between the food rotating on the spit and the cover surface, thus making full use of the hot gases and achieving speedy browning and cooking of the food to be grilled. For positioning flap 13 at the desired angle, it can be pivoted to cover 12 by means of friction pivots.

The supporting legs 44 disposed on or under housing 11 are advantageously foldable and lockable against the floor 20 of housing 11 when the grill is to be collapsed for storage. The legs are shown in their folded state in FIGURE 1 and in their open state in FIGURE 2.

For permitting the legs to be so manipulated, profiled ledges, or hinges, 45 are pivotally disposed in the vicinity of the lower edges of the narrow, lateral, side walls 24 of housing 11, to each of which ledges there are attached two supporting legs 44 pivotal over a narrow angular range in a direction parallel to the major surface of their associated ledge 45. When the legs are extended, as shown in FIGURE 2, they are held in this position by the abutment of ledges 45 against side walls 24.

The free ends 46 of the supporting legs 44, when they are folded under the floor 20 of housing 11, as shown in FIGURE 1, are each covered by a profiled ledge 45 and are thus held securely in their folded positions. For the purpose of folding the legs into the position shown in FIGURE 1, one ledge, i.e., the right-hand ledge, is first pivoted about its pivot axis 26 into its folded position. Then the left-hand ledge is similarly folded and the free ends 46 of its associated legs are brought through a ledge 45 and these legs are then spread outwardly in the directions of arrows 48 so that they will also be held securely in their respective positions.

Most advantageously, the foldable profiled ledges 45 bearing the supporting legs 44 are mounted on the shafts 26 of the air control flaps 25. This not only simplifies the resulting grill structure but also has the advantage of subjecting the shafts to increased friction forces due to the weight of the grill members supported by the legs so that the air control flaps are maintained in their set positions.

The manner in which the various parts of the grill can be placed within the housing 11 when the housing is to be closed for transportation or storage is indicated in FIGURE 4. When folding the grill up, first the spit 39 can be disposed diagonally in the bottom of housing 11 so as to rest on separator sheet 42. Then, the pan 17 is reinserted into the housing and the drip pan 36 is placed atop the pan 37 so as to rest on separator sheet 43. After that, the side sheets 37 are laid on top of pan 17 so that their front and rear edges extend parallel to the length of the housing 11. Finally, grill bars 28 are replaced on their support rails 30 and the rail 30 is lowered to its lowermost position by pivoting stud 32 until lever 33 engages the lowest one of its associated holes 34. The grill components are then all disposed completely within the housing 11 so that no piece extends out of the housing and the cover 12 can then be easily closed and secured.

The parallelogram arms 31 can be given a sufficient width so that they will come to abut against one another when the rails 30 are in their lowermost position. In this case, the abutting of the lever arms 31 will define the lowest position of the rails 30 so that it would not be necessary to provide a detent hole 34 to define such position. Alternatively, the lever arms 31 could be made narrower so that they will never come to abut against one another, in which case the lowermost position of the rail 30 will be defined by the lowest detent hole 34.

It will be understood that the above description of the present invention is susceptible to various modifications, changes, and adaptations.

I claim:

1. In a collapsible charcoal-grilling device composed of a box-shaped housing having an open top, a cover for closing the housing top, a pan disposed in the housing for holding the charcoal fuel, grill bars mounted above the pan and adjustable in height relative to the pan, and supporting legs mounted on the housing, the improvement wherein:

said pan is readily removable and is disposed in said housing to define an air space between said pan and the bottom and side walls of said housing, which air space is closed off by said pan and side walls at the upper edges of said walls, at least the bottom of said pan being provided with air passages for permitting air to flow from said air space to the region in which charcoal is to be burned;

at least one lateral wall of said housing is provided with an opening communicating with at least part of said air space for the passage of air thereto; and said device further comprises at least one movable blocking member associated with said opening for controlling the effective size thereof and hence the air flow therethrough, said blocking member being capable of completely closing the opening, at least one vertical, longitudinally movable separator sheet dividing the interior of said charcoal pan and disposed transverse to the longitudinal direction of said pan, and at least one further separator sheet disposed in the plane of said vertical separator sheet in the air space between said pan and said housing for dividing said air space into two separate spaces.

2. An arrangement as defined in claim 1 further comprising two parallelogram lever assemblies connected between said housing and said grill bars for permitting the height of said grill bars to be adjusted.

3. An arrangement as defined in claim 1 further comprising two hinges each attached to a respective lateral side wall of said housing and having a pivoting axis parallel to the edge formed by said lateral wall and the floor of said housing, and wherein there are four supporting legs, two of which are attached to the inside of each said hinge in such a manner that they are pivotal in the plane of said hinge, said hinges further including abutment means for limiting the degree of pivotal movement of each said leg.

4. An arrangement as defined in claim 3 wherein at least one of said hinges is provided with a recess and wherein the ends of said supporting legs come to rest underneath the hinges when the grill is in its collapsed state.

5. An arrangement as defined in claim 3 wherein each side wall of said housing is provided with an opening, there are two movable blocking members each associated with a respective opening, each said blocking member being pivotally movable, and each said hinge is mounted to pivot about the pivot axis of a respective one of said block members.

6. In a portable charcoal grill which is collapsible into suitcase form and which is composed of a box-shaped housing having an open top, a closed bottom, a front side wall, a rear side wall and two lateral side walls, a removable pan having a perforated bottom and disposed in the housing for holding charcoal fuel, the pan substantially filling the interior of the housing and being disposed in the housing to define an air space which extends between the bottom of the pan and the bottom of the housing and which is substantially closed off by the pan and the side walls of the housing at the upper edges of the side walls, at least one lateral side wall of the housing being provided with an adjustable air inlet opening communicating with at least part of the air space, grill bars mounted above the pan and connected to the housing to be adjusted in height relative to the pan, supporting legs mounted on the housing so as to be collapsible with respect thereto, detachable side sheets mountable at the upper edges of the lateral side walls of the housing to extend upwardly therefrom and provided with rescesses for holding a spit, and a cover hingedly connected to the rear side wall of the housing for closing its open top and capable of resting against the adjacent edge of the sheets when the housing top is open for use, the improvement wherein:

said side sheets have the form of non-rectangular parallelograms such that, when mounted on said housing, a portion of said sheets overhangs said front side wall and the edge of each said sheet adjacent said cover is inclined toward said front side wall;

said side sheets are provided with recesses for holding a roasting spit, said recesses being cut into the overhanging portion of sheets to support a spit above the top of said pan and in a vertical plane forward of the front longitudinal edge of said pan; and said arrangement comprises a deflecting flap hingedly attached to the front edge of said cover and arranged to be inclined forwardly of said cover, when said housing top is open for use, for directing heat toward the region of such spit, said flap being movable to a position in which it lies upon the upper edges of said side sheets, in which position it is above the location of the spit.

7. An arrangement as defined in claim 6 wherein said recesses are cut to support a spit in a vertical plane forward of said front side wall of said housing.

8. An arrangement as defined in claim 6 further comprising: two parallelogram lever assemblies each connecting said grill bars to a respective side wall of said housing for moving said bars to any desired height along a path generally parallel to said cover when the latter is resting against said sheets.

9. An arrangement as defined in claim 8 further comprising a height adjustment operating lever detachably connected to at least one lever of said parallelogram lever assembly and disposed outside said housing for adjusting the height of the grilling surface defined by said grill bars.

10. An arrangement as defined in claim 9 further comprising locking means between said housing and said grill bars for securing said grill bars at the desired height.

11. An arrangement as defined in claim 10 wherein said locking means include an engagement element mounted on said height-adjustment lever and a plurality of positioning openings provided in the housing lateral side wall adjacent said height-adjustment lever and disposed along the path followed by said engagement element when said lever is moved, said engagement element being insertable into any one of said positioning openings for holding said height-adjustment lever at any desired position.

References Cited

UNITED STATES PATENTS

| | | |
|---|---|---|
| 2,325,828 | 8/1943 | Betts. |
| 2,460,125 | 1/1949 | Carroll _____ 126—9 |
| 2,556,365 | 6/1951 | McKnight _____ 126—9 |
| 2,815,707 | 12/1957 | Morrow. |
| 2,838,991 | 6/1958 | Kleinmann et al. _____ 126—9 X |
| 2,852,016 | 9/1958 | Weatherwax _____ 126—9 |
| 3,151,609 | 10/1964 | Hastings. |
| 3,182,585 | 5/1965 | Rensch, et al. _____ 126—9 X |
| 3,348,471 | 10/1967 | Lackenbauer et al. |

CHARLES J. MYHRE, Primary Examiner

U.S. Cl. X.R.

99—400, 421; 126—9, 25